United States Patent [19]

Cutburth et al.

[11] Patent Number: 4,667,922

[45] Date of Patent: May 26, 1987

[54] SUPPORT ASSEMBLY HAVING THREE DIMENSION POSITION ADJUSTMENT CAPABILITIES

[75] Inventors: Ronald W. Cutburth, Tracy; F. Allen House, Livermore, both of Calif.

[73] Assignee: The United States of America as represented by the United States Department of Energy, Washington, D.C.

[21] Appl. No.: 796,463

[22] Filed: Nov. 8, 1985

[51] Int. Cl.[4] ............................................. F16M 13/00
[52] U.S. Cl. ..................................... 248/664; 248/179
[58] Field of Search .............. 248/664, DIG. 13, 645, 248/476, 179, DIG. 4; 372/107

[56] References Cited

U.S. PATENT DOCUMENTS

| | | | |
|---|---|---|---|
| 3,046,006 | 7/1962 | Kulicke, Jr. | 248/DIG. 13 X |
| 3,517,904 | 6/1970 | Verchain | 248/179 X |
| 3,850,402 | 11/1974 | Ando | 248/476 |

FOREIGN PATENT DOCUMENTS 632261 10/1927 France ................... 248/178

Primary Examiner—Ramon S. Britts
Assistant Examiner—Karen J. Chotkowski
Attorney, Agent, or Firm—P. Martin Simpson, Jr.; L. E. Carnahan; Judson R. Hightower

[57] ABSTRACT

An assembly for supporting an apparatus such as a microscope or laser to and against a planar surface is disclosed herein. This apparatus includes three specific arrangements for adjusting the positions of three segments of the apparatus so as to adjust the position of the overall apparatus with respect to the planar surface in the x-, y-and z-directions, where the x-direction and the y-direction are both parallel with the planar surface and perpendicular to one another and where the z-direction is perpendicular to the planar surface and the x-and y-directions. Each of two of the three arrangements includes its own means for providing x-, y- and z-adjustments (which includes rotation in the x, y plane) while it is only necessary for the third arrangement to provide adjustments in the z-direction.

8 Claims, 8 Drawing Figures

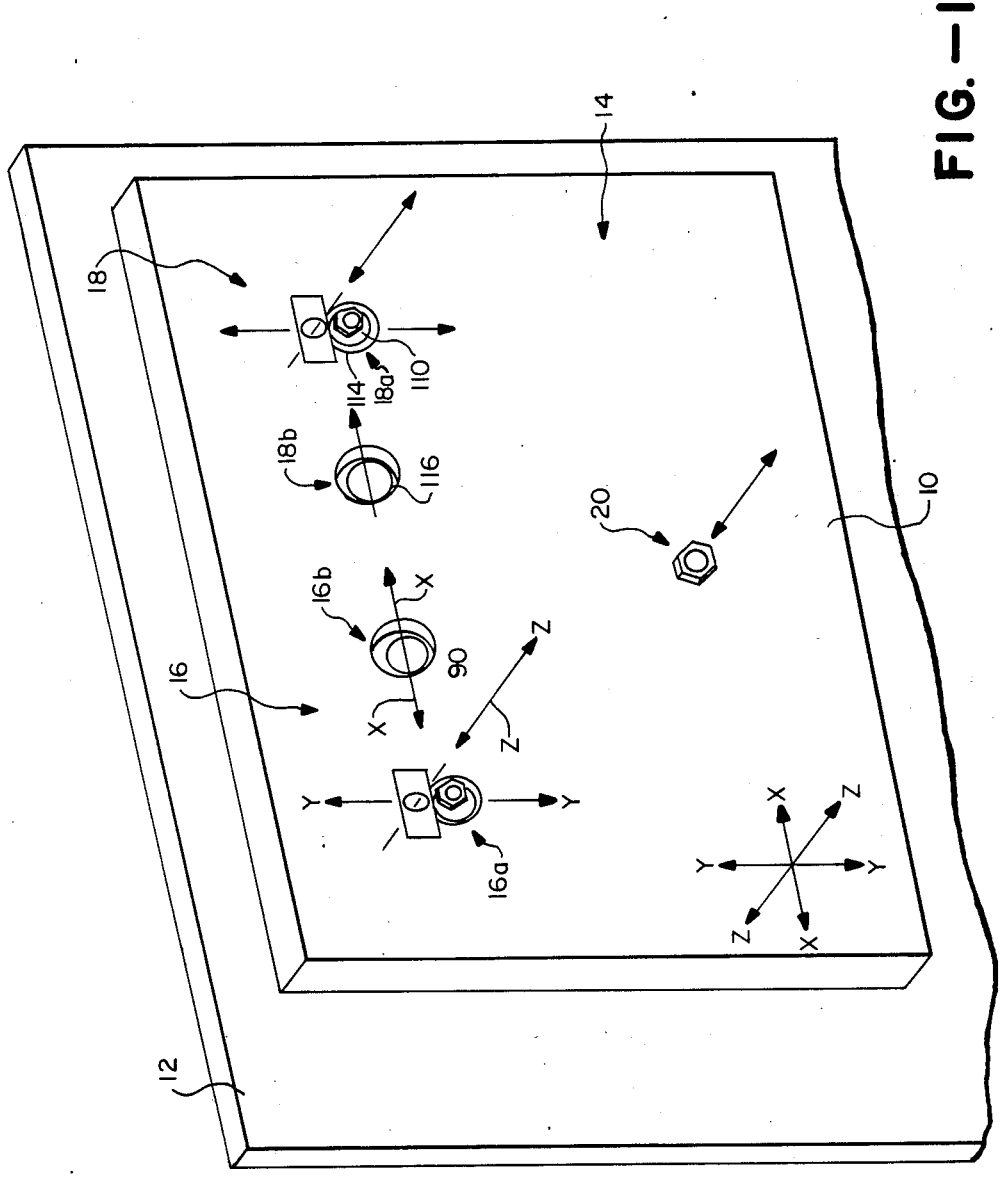
FIG.—1

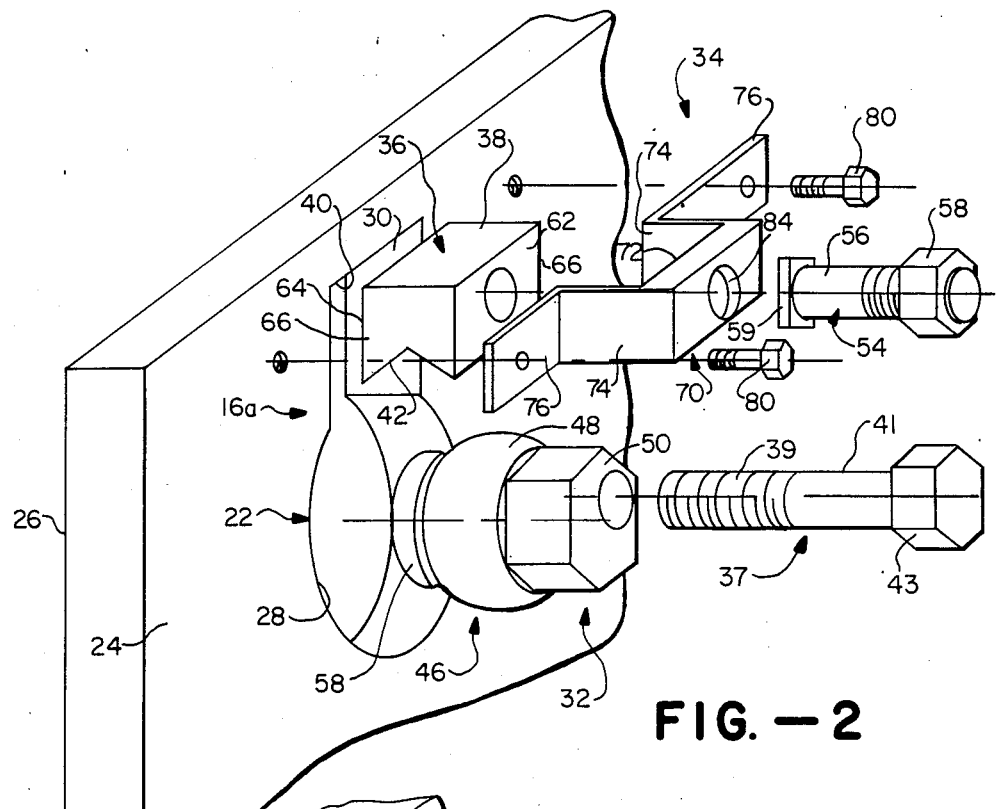
FIG.—2
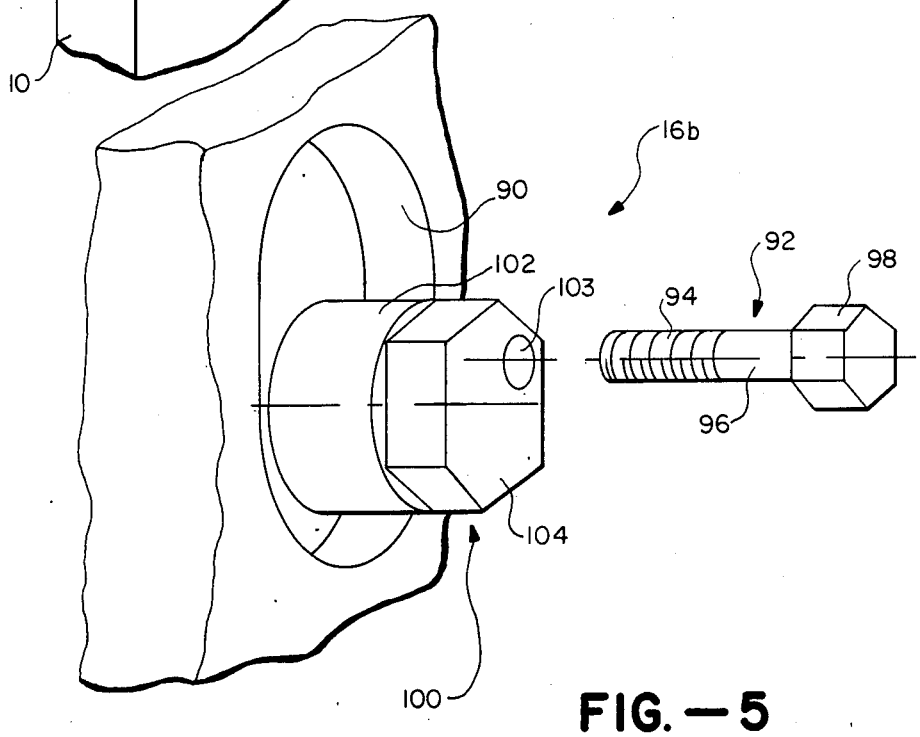
FIG.—5

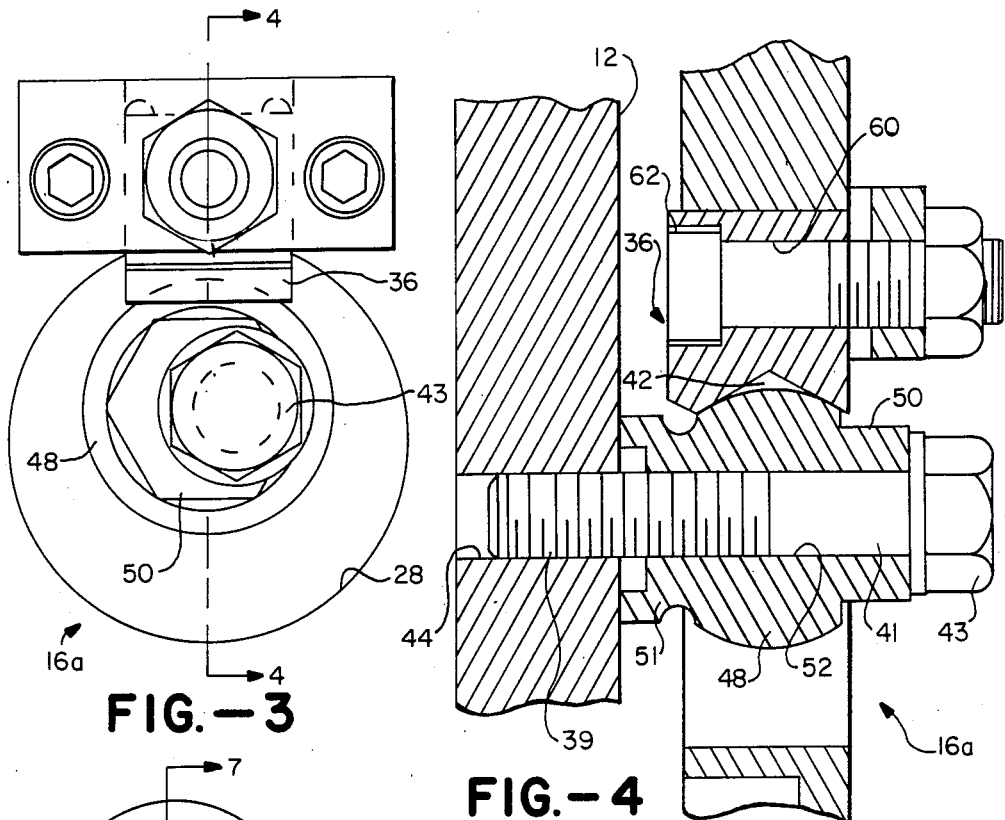
FIG.-3
FIG.-4
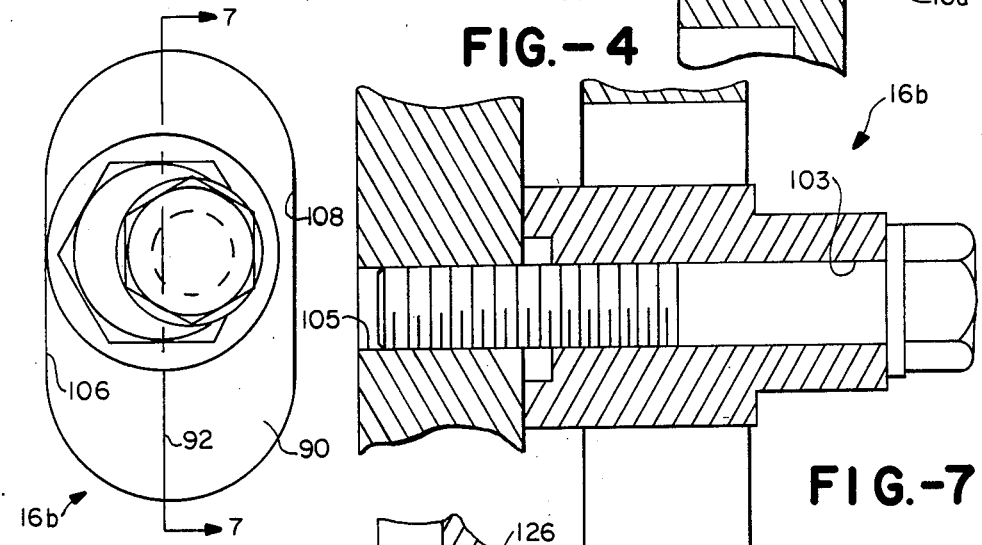
FIG.-6
FIG.-7
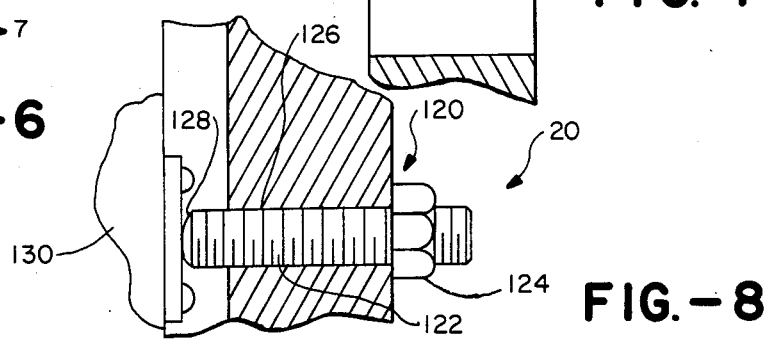
FIG.-8

SUPPORT ASSEMBLY HAVING THREE DIMENSION POSITION ADJUSTMENT CAPABILITIES

FIELD OF THE INVENTION

The United States Government has rights in this invention pursuant to contract number W-7405-ENG-48 between the United States Department of Energy and the University of California for the operation of the Lawrence Livermore National Laboratory.

BACKGROUND OF THE INVENTION

The present invention relates generally to a support assembly for an apparatus and more particularly to an assembly which is specifically designed to support an apparatus for positional adjustment in three dimensions to and against the planar surface, which assembly has three dimensional position adjustment capabilities (and thus six degrees of freedom, as will be seen).

There are certain situations where it is imperative that a given apparatus be supported in a particular position relative to a frame of reference. For example, in the case where a laser forms part of a larger optical train, it may be critical to support the laser in a predetermined position relative to other optical components in the trains such as mirrors, lenses and the like. To accomplish this in a reliable way, especially where the laser or other such apparatus (for example a telescope) is large and heavy, it has been necessary heretofore to provide a relatively complicated and costly arrangement of adjusting mechanisms.

SUMMARY OF THE INVENTION

In view of the foregoing, it is a primary object of the present invention to provide an uncomplicated and yet reliable assembly for supporting an apparatus such as a relatively large and heavy laser or telescope in a predetermined position.

A more specific object of the present invention is to provide an assembly of the last mentioned type which supports the apparatus to and against a planar surface for three dimensional adjustment relative to that surface.

Another specific object of the present invention is to provide an uncomplicated and reliable arrangement which forms part of the last mentioned assembly and which functions to adjust the position of a segment of the apparatus in the x-, y- and z-directions with respect to a planar surface, where the x-direction and the y-direction are both parallel with the planar surface and perpendicular to one another and where the z-direction is perpendicular to the planar surface and the x- and y-directions.

As will be described in more detail, the arrangement just recited for adjusting the position of a segment of the apparatus includes the following six means:

(1) first means interlocked with the apparatus segment for movement with the latter in the x- and y-directions relative to said planar surface but not the z-direction;

(2) second means engaged against the first means and movable in a predetermined way relative to the planar surface while remaining in engagement with the first means for moving the latter and the apparatus segment to a limited extent in the y-direction relative to the planar surface;

(3) third means for moving the second means in its predetermined way whereby to adjust the position of the apparatus in the y-direction relative to said planar surface;

(4) fourth means engaged against a fixed surface of the apparatus segment which is spaced from the first and second means and movable in a predetermined way relative to the planar surface while remaining in engagement with the fixed surface for moving the apparatus segment and the first means to a limited extent in the x-direction relative to the planar surface and the second means while the first means remains engaged against the second means;

(5) fifth means for moving the fourth means in its predetermined way whereby to adjust the position of the apparatus segment in the x-direction relative to the planar surface and the second means; and (6) sixth means for moving the apparatus segment to a limited extent in the z-direction relative to the planar surface and the first means while the latter remains interlocked for movement with the apparatus segment in the x- and y-directions, whereby to adjust the position of the apparatus segment in the z-direction relative to said planar surface and the first means.

In the actual and preferred embodiment illustrated herein, the first means recited above takes the form of a support block defining a groove which extends in the x-direction and which has a v-shaped cross section and the second means includes a sphere extending into the groove of the support block in engagement against the latter. The third means in this preferred embodiment includes means for moving the sphere about an axis which is eccentric with respect to its center and which extends in the x-direction whereby to cause the support block to move in the y-direction. The fourth means in this same preferred embodiment includes a disc-shaped member engaged against the fixed surface of the apparatus segment and the fifth means includes means for moving the disc-shaped member about an axis which is eccentric with respect to its center and which also extends in the z-direction, whereby to cause the apparatus segment and support block to move in the x-direction. Finally, in the preferred embodiment, the sixth means includes a threaded rod means extending in the z-direction and means supporting the rod for rotational movement about its own axis. The rod itself is interconnected with the support block and the apparatus segment for causing the latter to move on the rod in the z-direction relative to the planar surface and the support block.

The arrangement just described both generally and in a preferred embodiment forms only part of the overall assembly for supporting the apparatus to and against a planar surface. The assembly includes a second such arrangement for adjusting the position of a second segment of the apparatus in three dimensions and a third, different arrangement which serves to adjust the position of third segment of the apparatus in the z-direction only. These three arrangements together are all that are necessary to reliably adjust the overall apparatus in three dimensions relative to a planar surface (and hence, six degrees of freedom including movement in each of the x-, y-, and z-directions and rotation about x-, y- and z- extending axes.

Additional objects, advantages and novel features of the invention will be set forth in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The overall assembly and the adjustment arrangements forming parts thereof will be described in more detail hereinafter in conjunction with the drawings wherein:

FIG. 1 is a perspective view of an overall assembly which is designed in accordance with the present invention to support an apparatus to and against a vertically extending planar surface and which includes three distinct arrangements which cooperate with one another for adjusting the apparatus in the x-, y- and z-directions with respect to the planar surface where the x-direction is horizontal, the y-direction is vertical and both are parallel with the planar surface and the z-direction extends normal to the planar surface;

FIG. 2 is an exploded perspective view of a part of one of the arrangements forming part of the assembly of FIG. 1 for adjusting the position of a segment of the apparatus in the y- and z-directions;

FIG. 3 is a front elevational view of the arrangement part illustrated in FIG. 2;

FIG. 4 is a sectional view taken generally along line 4—4 in FIG. 3;

FIG. 5 is an exploded perspective view of a second part of one of the arrangements forming part of the assembly of FIG. 1 for adjusting the position of a segment of the apparatus in the x-direction;

FIG. 6 is a front elevational view of the second part of the arrangement illustrated in FIG. 5;

FIG. 7 sectional view taken generally along 7—7 in FIG. 6; and

FIG. 8 is a vertical sectional view of a different arrangement forming part of the assembly of FIG. 1, specifically an arrangement for adjusting a corresponding segment of the apparatus in the z-direction only.

DETAILED DESCRIPTION OF THE INVENTION

Reference will now be made in detail to a preferred embodiment of the invention, an example of which is illustrated in the accompanying drawings. While the invention will be described in connection with the preferred embodiment, it will be understood that it is not intended to limit the invention to that embodiment. On the contrary, it is intended to cover all alternatives, modifications and equivalents as may be included within the spirit and scope of the invention as defined by the appended claims.

Turning now to the drawings, wherein like components are designated by like reference numerals throughout the various Figures, attention is initially directed to FIG. 1 which illustrates in perspective view a plate member 10 positioned against a vertically extending planar surface 12. While not shown, plate member 10 forms part of an overall apparatus such as a laser or telescope. As will be described in detail hereinafter, the present invention is directed to an assembly for supporting plate member 10 and therefore the overall apparatus including the plate member against planar surface 12 in a way which allows for adjusting the position of the plate member (and therefore the apparatus) in the x-, y- and z-directions with respect to the planar surface where the x-direction is horizontal, the y-direction is vertical and both are parallel to surface 12 and where the z-direction is perpendicular to planar surface 10, as indicated by the arrows in FIG. 1. The planar surface itself may be part of a support wall, it may be another plate member which is itself adjustably supported in three dimensions against a planar surface, or other suitable support means.

For purposes of clarity, it will be assumed that planar surface 12 is a fixed vertical surface, that the x- and y-directions recited above are parallel with the planar surface with the x direction extending horizontal and the y-direction extending vertical, and that the z-direction is normal to the planar surface. However, it is to be understood that the present invention is not limited to adjustably supporting the plate member to a vertically extending surface and therefore the three dimensions of adjustment can be described generally where the x-direction and y-directions are both parallel with the planar surface and perpendicular to one another (but not necessarily horizontal and vertical) and where the z-direction is perpendicular to the planar surface and the x- and y-directions.

Still referring to FIG. 1, the overall assembly for supporting plate member 12 in the three dimensions recited above is shown generally at 14 comprised of three separate support arrangements 16, 18 and 20. As seen in FIG. 1, the two support arrangements 16 and 18 are located generally within a common horizontal plane near the upper horizontal edge of the plate member 10 while arrangement 20 is located below arrangement 16 and 18 and equidistant from the two. As will be described in detail hereinafter, each of the arrangements 16 and 18 is itself capable of adjusting a portion of plate member 10 in the x-, y- and z-direction relative to planar surface 12. On the other hand, arrangement 20 is designed for single dimension adjustment in the z-direction only. As will be seen hereinafter, with these three arrangements, the entire plate member 10 and therefore the entire apparatus including the plate member is adjustable in the x-, y- and z-directions relative to surface 12 in an uncomplicated and reliable manner.

Still referring to FIG. 1, attention is specifically directed to arrangement 16 which is shown including two sub-arrangements 16a and 16b. As will be seen immediately below, the sub-arrangement 16a is designed to adjust its surrounding portion of plate member 10 in the y-direction, either upwardly or downwardly, and in the z-direction, either inward or outward, as indicated by the y- and z- arrows. At the same time, sub-arrangement 16b is designed for adjusting the same portion of plate member 10 in the x-direction, either to the left or to the right, as indicated by the x- arrows. The sub-arrangement 16a is illustrated in detail in FIGS. 2–4 and the sub-arrangement 16b is illustrated in detail in FIGS. 5-7.

Turning now to FIGS. 2-4, attention is directed to a detailed description of the sub-arrangement of 16a. As seen best in FIG. 2, an opening 22 is provided entirely through plate member 10 from its front face 24 to its back face 26 and, as will be seen, is provided to accommodate the sub-arrangement 16a. This opening which is generally configured as an inverted keyhole (and hereinafter will be referred to as such) includes a lower circular section 28 and upper rectangular section 30.

Sub-arrangement 16 includes a mechanism 32 for adjusting the portion of plate member 10 surrounding the inverted keyhole 22 in the y-direction and a mechanism 34 for adjusting the same portion of the plate member in the z-direction. In addition, sub-arrangement 16a includes what may be referred to as a support block 36 which serves to link the mechanism 32 and 34 and sub-arrangement 16b (as will be seen hereinafter) to one another and to the plate member. To this end, support block 36 is sized to fit slidably within section 30 of inverted keyhole 22 such that its upper surface 38 rests against the underside 40 of section 30 of the inverted keyhole and such that its width from left to right, as viewed in FIG. 3, is just slightly less than the width of section 30. As best illustrated in FIG. 4, the depth of the support block is slightly greater than the depth of plate member 10. Finally, as best illustrated in FIGS. 2 and 4, the underside of support block 36 defines a downwardly facing channel 42 which extends from the left side of the block to its right side and which an inverted is v-shape in configuration. The precise function of support block 36 will be described below in conjunction with mechanisms 32 and 34 and sub-arrangement 16b.

As stated above, mechanism 32 is responsible for adjusting the portion of plate member 10 surrounding inverted keyhole 22 in the y-direction. To this end, mechanism 32 includes a bolt 37 having a shaft divided into a threaded end section 39 and unthreaded section 41 supporting a hexagonal head 43. As best illustrated in FIG. 4, the threaded end section 38 of the bolt's shaft is threadedly connected into a cooperating threaded opening 44 extending into surface 12 such that the unthreaded section 41 and hexagonal head 43 extend out in front of surface 12. In addition to bolt 37, mechanism 32 includes a separate member 46 which consists of a center section in the form of a sphere 48, a hexagonal head 50 fixedly connected to one side of the sphere and a base or pedestal 51 fixedly connected to the opposite side of the sphere.

As best illustrated in FIG. 3, the shaft of bolt 37 is located off center within section 28 of inverted keyhole 22, that is, it is located a slight distance to the right of a vertical plane through the center of section 28. At the same time, member 46 is to extend through the inverted keyhole such that its center section, that is, sphere 48, is disposed within section 28 directly below and supports block 36 such that the axis of the sphere in the z-direction lies within a vertical plane to one side of the axis of the shaft of bolt 36. As a result, member 46 is designed to rotate eccentrically about the unthreaded section 41 of the bolt shaft in an eccentric fashion. Therefore, member 46 includes an eccentrically located opening 52 extending therethrough from the free end of hexagonal head 40 to the free end of base 51 for receiving the bolt shaft, as best illustrated in FIG. 4.

With member 46 positioned around the unthreaded shaft section 41 in the manner described immediately above, the outer surface of sphere 48 extends into the v-shaped groove 42 of support block 36 and engages against the latter. At the same time, base 51 engages against surface 12. So long as bolt 37 is threadedly connected into opening 44 tightly against member 46, the latter remains wedged between surface 12 and the hexagonal head 42 of the bolt and therefore remains fixed in place. However, upon loosening the bolt, member 46 is free to rotate eccentrically about the shaft of the bolt. To this end, hexagonal head 50 serves to receive a crescent wrench or the like in order to more readily provide rotation of the entire member 46. By providing this rotation, the sphere 48 is caused to rotate about an eccentric path so that it has a component of movement in the y-direction, that is, vertically. At the same time, due to the weight of plate member 10, the support block 36 remains in engagement with sphere 48 at all times during rotation of the latter. As a result, rotation of the sphere causes support block 36 and therefore the portion of plate member 10 surrounding inverted keyhole 28 to move in the y-direction, either upward or downward depending upon whether the y-component of movement of the eccentrically rotated sphere is upward or downward. Once the sphere is moved to the desired point for positioning the surrounding portion of plate member 10 at the desired location in the y-direction, the sphere can be locked in place by tightening bolt 37.

Returning to FIG. 2 in conjunction with FIGS. 3 and 4, attention is now directed to mechanism 34. As stated previously, this mechanism is designed to adjust that portion of plate member 10 surrounding inverted key member 22 in the z-direction. As illustrated best in FIG. 2, mechanism 34 is shown including a bolt 54 including a threaded shaft 56 having an enlarged hexagonal head 58 at one end and enlarged lock wing 58 at its opposite end. As best illustrated in FIG. 4, a section of threaded shaft 56 is located within an unthreaded through hole 60 which extends entirely through support block 36 from the front face 62 of the latter to its back face 64 at a point equidistant from the sides 66 of the support block. For reasons to become apparent below, the through hole 60 is sufficiently large to allow the shaft 56 of bolt 54 to rotate about its own center axis. At the same time, lock wings 59 are slidably disposed within a cooperating annular recess 62 extending around opening 60 at the back end 64 of support block. This allows the bolt 54 to rotate about its own axis while preventing it from being pulled out longitudinally from opening 60 in the forward direction. The function of bolt 54 interlocked to support block 36 in this manner will be discussed below.

In addition to bolt 54, mechanism 34 includes a clamp member 70. This clamp member consists of a u-shaped section including a base block 72 and opposing upstanding legs 74 and opposite wings 76 connected to the free ends of legs 74 and extending away from one another in directions normal to the legs. The u-shaped section of clamp member 70 is sufficiently wide, that is, legs 74 are spaced from one another a sufficient distance, to just allow support block 36 to fit between the legs from one side 66 to an opposite side 66. At the same time, the base block 72 is positioned directly in front of the front face 62 of the support block by means of wings 76 which are fixedly connected to the front face 24 of plate member 10 on opposite sides of section 40 of the inverted keyhole by suitable fastening means such as the screws 80. This fixedly connects the entire clamp 70 and therefore base member 72 to plate member 10. At the same time, a threaded opening 84 is provided through base member 72 in axial alignment with through opening 60 in support block 36. The threaded opening 84 is configured to receive threaded shaft 56 of bolt 54 in a threaded fashion, as best illustrated in FIG. 4.

With the bolt 54 and clamp 70 interconnected to one another and to the plate member 10 and support block 36 in the manner just described, overall mechanism 34 operates in the following manner to adjust the position of the portion of plate member 10 surrounding inverted key 22 in the z-direction. Specifically, using a crescent wrench or other suitable means, the bolt 54 is rotated about its own axis. Because lock wings 59 are disposed within annular recess 62, the bolt cannot move in the forward direction out of opening 60. At the same time, because enlarged head 58 rests against the base block 72 of clamp 70, the shaft cannot move out of opening 60 in the opposite direction. Thus, even though the bolt is allowed to rotate about its own axis, it does not move longitudinally relative to support block 36. However, because the base block 72 of clamp 70 is threadedly connected around the threaded shaft of bolt 54, when the latter is rotated, the base block is caused to move longitudinally along threaded shaft 56, either in the direction of hexagonal head 58 or in the direction of lock wings 59, depending upon whether the bolt is rotated clockwise or counterclockwise. Since the base block is fixedly connected to plate member 10 by means of wings 76, this longitudinal movement of the base block along the shaft of bolt 54 causes the plate member 10 to move in the same direction, that is, parallel to the threaded shaft 56 (and therefore in the z-direction). Therefore, since the support block 36 does not move longitudinally relative to bolt 54, the plate member 10 actually rides over the top surface 38 of the support block without the latter moving. As a result, the position of the support block relative to mechanism 46 remains unchanged and cooperation of these two elements of the overall sub-arrangement 16a remain uneffected by the operation of mechanism 34.

Having described sub-arrangement 16a making up overall arrangement 16, attention now is directed to sub-arrangement 16b which is designed to adjust that portion of plate member 10 surrounding inverted keyhole 28 in the x-direction. To that end, as illustrated in FIGS. 1, 5 and 6, an opening 90 extends through plate member 10 from its front face 24 to its back face 26. This through hole is horizontally aligned to one side of sub-arrangement 16a (the right hand side, as viewed in FIG. 1) and is oblong in configuration such that its longer axis generally indicated at 92, extends vertically (in the y-direction).

Referring specifically to FIG. 5, sub-arrangement 16b is shown including a bolt 92 similar to the previously described bolt 36, that is, a bolt including a shaft having a threaded end section 94 and an unthreaded end section 96. The unthreaded section carries at its free end a hexagonal head 98. Sub-arrangement 16b also includes a member 100 comprised of a disc-shaped segment 102 and a hexagonal head 104 fixedly connected to one end of the disc.

Referring specifically to FIGS. 6 and 7, the shaft of bolt 92 is shown extending through opening 90 in plate member 10 such that its threaded end section 94 is thread connected into a cooperating threaded hole 105 so as to extend in the z-direction. From FIG. 6, it can be seen that threaded hole 105 and the shaft of bolt 92 are located a small distance to the right of the major axis 92 of opening 90. As best seen in FIGS. 5 and 7, member 100 includes an unthreaded through opening 103 for slidably receiving the unthreaded shaft section 96 of bolt 92. Note from FIG. 6 that this latter through hole is positioned to one side of the center of the disc, e.g., to the right side of its center as viewed in FIG. 6. This places the disc 102 within opening 90 while hexagonal head 104 is disposed in front of the front face 24 of plate member 10 and the back end of the disc engages against front face 24.

Having described sub-arrangement structurally, attention is now directed to the way in which is functions to adjust that portion of plate member 10 surrounding inverted key hole 22 in the x-direction. Specifically, if the bolt 92 is threaded into cooperating hole 105 tightly against member 100, the latter is fixed in place. On the other hand, if the bolt is loosened, the entire member 100 and particularly the disc-shaped section 102 is free to rotate eccentrically about the shaft of bolt 92. This eccentric rotation results in a component of movement of the disc in the x-direction, either to the left or to the right of opening 90, depending upon the position of the disc relative to the shaft of bolt 92. At the same time, the disc engages either the vertically extending left hand shoulder 106 of opening 90, as illustrated in FIG. 6, or the right hand shoulder 108. As disc 102 is rotated eccentrically, its component of movement in the x-direction pushes against the engaging surface 106 or 108 and thereby pushes the plate member in the same direction. Since support block 36 is positioned within section 40 of inverted keyhole 22 in a way which prevents it from moving in the x-direction within section 40, the support member moves with plate member 10 as the latter is pushed in the x-direction. This causes the channeled underside of the support block to slide over sphere 48 which therefore is not affected by the movement of plate member 10.

From the functional description of sub-arrangement 16b, it should be apparent that that portion of plate member 10 surrounding inverted keyhole 22 can be adjusted in the x-direction by rotating member 100. A crescent wrench or the like can be applied to hexagonal head 104 in order to provide desired degree of rotation. Once the plate member is so adjusted, the bolt 92 can be tightened against member 100 in order to fix it in place.

Having described sub-arrangement 16 both structurally and functionally, it should be clear that the entire arrangement 16 serves to adjust that portion of plate member 10 surrounding inverted keyhole 22 in three dimensions, specifically, the previously defined x-, y- and z-directions. Moreover, in the case of mechanism 32 forming part of sub-arrangement 16a and in the case of sub-arrangement 16b, both fine and gross adjustments are possible, depending upon where the sphere 46 and disc 102 are positioned within their cooperating holes in plate member 10. More specifically, the y- component of movement of the sphere as the latter is rotated about its eccentric axis varies in degree with movement of the sphere depending upon where the latter is relative to its axis of eccentric rotation. Thus, the y- component can vary greatly with a relatively small degree of eccentric rotation or it can vary to a lesser extent. This is also true for the disc 102. Thus, if it is desirable to provide a gross degree of adjustment, the sphere or disc will be initially positioned accordingly within its cooperating hole in plate member 10 and if it is desirable to start out with a fine adjustment, the sphere or disc will be initially positioned accordingly within its same cooperating hole. Obviously, whether a gross adjustment is required initially or a fine adjustment, the maximum degree of adjustment is limited and this is also true for the adjustment in the z-direction by means of mechanism 34.

Having described overall arrangement 16 both structurally and functionally, it should be noted that arrangement 18 may be identical and therefore includes a sub-arrangement 18a corresponding to sub-arrangement 16a and a sub-arrangement 18b corresponding to sub-arrangement 16b. Because the two arrangements may be identical, arrangement 18 will not be described or illustrated, except to the extent that it is shown in FIG. 1. This Figure specifically illustrates a mechanism 110 (corresponding to mechanism 32) and a mechanism 112 (corresponding to mechanism 34) in association with an inverted keyhole 114 (corresponding to inverted keyhole 22). Sub-arrangement 18b is shown in association with an oblong opening 116 (corresponding to opening 90). In the particular embodiment illustrated, it should be noted that opening 116 is on the left side of opening 110 (as viewed in FIG. 1) whereas the opening 90 is on the right hand side of opening 28, all of which are horizontally aligned with one another. The opening 116 could be positioned on the right hand side of opening 114 and/or the opening 90 could be positioned on the left hand side of opening 28. In either case, the two sub-arrangements 16b and 18b can be utilized to lock in the position of the plate member 10 in the x-direction.

Having now described both of the arrangements 16 and 18, it should be apparent that these two arrangements cooperate with one another to provide the following adjustments of overall plate member 10 (and therefore the apparatus including the plate member) in the x-, y- and z-directions. First, the mechanisms 32 and 110 serve to either raise or lower the entire plate member to a limited extent in the y-direction or to tilt either the top left hand corner of the plate member or the top right hand corner relative to the other by adjusting one corner upward and one corner downward. The mechanisms 34 and 112 serve to tilt the top edge of the plate member toward or away from planar surface 12 uniformly and the mechanism 34 itself serves to adjust the left hand edge of the plate member towards or away from surface 12 while mechanism 112 itself serves to adjust the position of the right hand edge of the plate member towards or away from surface 12. Finally, sub-arrangements 16b and 18b serve to adjust the position of the entire plate member 10 in the x-direction, either to the left or to the right and also to tilt the top left hand corner relative to the top right hand corner, and vise versa.

One important point to note from the discussion of arrangements 16 and 18 immediately above is that these two arrangements by themselves are used to adjust the entire plate member 10 in the x-direction and y-direction. Thus, it is not necessary for the third arrangement making up the overall support assembly, that is, arrangement 20 to adjust the plate in either the x- or y-direction. Rather, arrangement 20 is only necessary to adjust the bottom end of the overall plate member in the z-direction which causes the bottom edge of the plate member to tilt towards or away from surface 12, as will be seen below.

Arrangement 20 is shown in FIG. 8 including a bolt 120 having a threaded shaft 122 and a hexagonal head 124. A cooperating threaded opening 126 extends through plate member 10 in the z-direction below and equidistant from arrangements 16 and 18, as illustrated in FIG. 1. As illustrated in FIG. 8, the threaded shaft is thread connected through opening 126 so that its free end 128 engages against surface 12 directly or, as illustrated, against a stop plate 130 suitably mounted against surface 12. In this way, the bolt can be rotated in one direction or the other while its end 128 engages stop plate 130 in order to force the bottom edge of the plate member towards or away from surface 12. In this latter regard, it should be noted that the bolt 122 is biased against stop plate 130 by the moment arm of the apparatus including plate member 10. This is because the apparatus is assumed to be positioned above the bolt 120. If that were not the case, the shaft 122 of bolt 120 could be fixedly connected with stop plate 130 in the longitudinal direction while being rotatable about its own axis (similar to the manner in which bolt 54 is connected to support block 36) such that the plate member 10 rides along the shaft 122 of bolt 120 as the latter is rotated.

It should be noted that as the bottom of plate 10 is adjusted in the z-direction, this causes the entire plate to tilt about its top horizontal edge. This causes the support block 36 to rotate slightly about sphere 48. However, because of v-shaped channel 42, this slight rotation motion has not effect on the desired inter-relationship between the sphere and support block.

The foregoing description of the preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended thereto.

What is caimed is:

1. An assembly for supporting an apparatus to and against a planar surface, said assembly including an arrangement for adjusting the position of a segment of said apparatus in the x-, y-, and z-directions with respect to said planar surface, where the x-direction and the y-direction are both parallel with said planar surface and perpendicular to one another and where the z-direction is perpendicular to said planar surface and the x- and y-directions, said arrangement comprising:
   (a) first means including a support block defining a groove which extends in the x-direction and which has a V-shaped cross section interlocked with said apparatus segment for movement with the latter in the x- and y-directions but not the z-direction relative to said planar surface;
   (b) second means including a sphere extending into the groove of said support block so as to engage against the latter, said second means being movable in a predetermined way relative to said planar surface;
   (c) third means for moving said second means in its predetermined way whereby to adjust the position of said apparatus in the y-direction relative to said planar surface, said third means including means for moving said sphere about an axis which is eccentric with respect to its center and which extends in the z-direction, whereby to cause the support block to move in the y-direction;
   (d) fourth means engaged against a fixed surface of said apparatus segment spaced from said first and second means and movable in a predetermined way relative to said planar surface while remaining in engagement with said fixed surface for moving said apparatus segment and said first means to a limited extent in the x-direction relative to said planar surface and said second means while said first means remains engaged against said second means;
   (e) fifth means for moving said fourth means in its predetermined way whereby to adjust the position of said apparatus in the x-direction relative to said planar surface and said second means; and
   (f) sixth means for moving said apparatus segment to a limited extent in the z-direction relative to said planar surface and relative to said first means while the latter remains interlocked for movement with said apparatus segment in the x- and y-directions, whereby to adjust the position of said apparatus segment in the z-direction relative to said planar surface and said first means.

2. An assembly according to claim 1 wherein said fourth means includes a disc-shaped member engaged against said fixed surface, wherein said fixed surface extends in the y-direction, and wherein said fifth means includes means for moving said disc-shaped member about an axis which is eccentric with respect to its center and which extends in the z-direction, whereby to cause said apparatus segment and support block to move in the x-direction.

3. An assembly according to claim 2 wherein said sixth means includes a threaded rod means extending in the z-direction and means supporting said rod for rotational movement about its own axis, said rod means being interconnected with said support block and said apparatus segment for causing the latter to move on said rod in the z-direction relative to said planar surface and said support block.

4. An assembly for supporting an apparatus to and against a vertically extending planar surface, said assembly including an arrangement for adjusting the position of a generally vertically extending plate-like segment of said apparatus in the x-, y- and z-directions with respect to said planar surface, where the x-direction extends horizontally, the y-direction extends vertically, the x- and y-directions are parallel to said planar surface and the z-direction is perpendicular to the vertically extending planar surface, said arrangement comprising:

(a) a support block disposed with a first section of a first cooperating opening in said plate-like segment of said apparatus for movement with said plate-like member in the x- and y-directions but not the z-direction relative to said planar surface, said support block defining a groove which extends in the x-direction and which has a V-shaped cross section facing downward;

(b) means including a sphere disposed within a second section of said first operating opening and extending into the groove of said support block so as to engage against the latter, said sphere being mounted for movement relative to said planar surface about an axis which is eccentric with respect to its center and which extends parallel to the z-direction, said sphere remaining in engagement with said support block during said last-mentioned movement for moving the latter and said plate-like segment to a limited extent in the y-direction relative to said planar surface;

(c) means for moving said sphere about said eccentric axis, whereby to adjust the position of said plate-like segment in the y-direction relative to said planar surface;

(d) a disc-shaped member disposed within a second cooperating opening in said plate-like segment horizontally to one side of said first cooperating opening while engaged against a vertically extending fixed surface of said plate-like segment, said disc-shaped member being mounted for movement about an axis which is eccentric with respect to its center and which extends in the z-direction while remaining in engagement with said fixed surface for moving said plate-like segment and said support block to a limited extend in the x-direction relative to said planar surface and said sphere while said support block remains engaged against said sphere;

(e) means for moving said disc-shaped member about its eccentric axis, whereby to adjust the position of said plate-like segment in the x-direction relative to said planar surface and said sphere; and (f) means for moving said plate-like segment to a limited extent in the z-direction relative to said planar surface and relative to said support block while the latter remains interlocked for movement with said plate-like segment in the x- and y-directions, whereby to adjust the position of said plate-like segment in the z-direction relative to said planar surface and relative to said support block, said last-mentioned means including a threaded rod means extending in the z-direction and means supporting said rod for rotational movement about its own axis, said rod being interconnected with said support block and said plate-like segment for causing said latter to move on said rod in the z-direction relative to said planar surface and relative to said support block.

5. An assembly for supporting an apparatus to and against a vertically extending planar surface, said assembly comprising:

(a) a pair of arrangements for adjusting the positions of a pair of horizontally spaced segments, respectively, of said apparatus in the x-, y- and z-directions with respect to said planar surface, where the x-direction extends horizontally, the y-direction extends vertically, both the x- and y-directions being parallel to said planar surface and the z-direction extends normal to said vertical surface, each of said arrangements including;

(i) first mean interlocked with its corresponding apparatus segment for movement with the latter in the x- and y-directions but not the z-direction relative to said planar surface said first means including a support block defining a groove which extends in the x-direction and which has a V-shaped cross section, (ii) second means engaged against said first means and movable in a predetermined way relative to said planar surface while remaining in engagement with said first means for moving the latter and said corresponding apparatus segment to a limited extent in the y-direction relative to said planar surface said second means including a sphere extending into the groove of said support block and engaging against the latter, (iii) third means for moving said second means in its predetermined way whereby to adjust the positions of said corresponding apparatus segment in the y-direction relative to said planar surface said third means including means for moving said sphere about an axis which is eccentric with respect to its center and which extends in the z-direction, whereby to cause said support block to move in the y-direction, (iv) fourth means engaged against a fixed vertical surface of said corresponding apparatus segment spaced from said first and second means and movable in a predetermined way relative to said planar surface while remaining in engagement with said fixed surface for moving said corresponding apparatus segment and said first means to a limited extent in the x-direction relative to said planar surface and said second means while said first means remains engaged against said second means, (v) fifth means for moving said fourth means in its predetermined way whereby to adjust the position of said apparatus in the x-direction relative to said planar surface and said second means, and (vi) sixth means for moving said corresponding apparatus segment to a limited extent in the z-direction relative to said planar surface and relative to said first means while the latter remains interlocked for movement with said corresponding apparatus segment in the x- and y-directions, whereby to adjust the position of said apparatus segment in the z-direction relative to said planar surface and said first means; and (b) means for moving a third apparatus segment to a limited extent in the z-direction relative to said planar surface and said pair of arrangements, said third segment being disposed vertically below said pair of arrangements and approximately equidistant from each thereof.

6. An assembly according to claim 5 wherein said fourth means includes a disc-shaped member engaged against said fixed surface and wherein said fifth means includes means for moving said disc-shaped member about an axis which is eccentric with respect to its center and which extends in the z-direction, whereby to cause said apparatus segment and support block to move in the x-direction.

7. An assembly according to claim 6 wherein said sixth means includes a threaded rod means extending in the z-direction and means supporting said rod for rotational movement about its own axis, said rod being interconnected with said support block and said apparatus segment for causing the latter to move on said rod in the z-direction relative to said planar surface and said support block.

8. An assembly for supporting a given plate member forming part of an apparatus to and against a planar surface, said assembly including an arrangement for adjusting the position of a segment of said given plate member in the x-, y-, and z-directions with respect to said planar surface, where the x-direction and the y-direction are both parallel with said planar surface and perpendicular to one another and where the z-direction is perpendicular to said planar surface and the x- and y-directions, said arrangement comprising:

(a) first means including a support block interlocked with said plate member segment for movement with the latter in the x- and y-directions but not the z-direction relative to said planar surface;

(b) second means including a drive member engaged against said support block, said drive member being movable in a predetermined way relative to said planar surface while remaining in engagement with said support block for moving the latter and said plate member segment to a limited extent in the y-direction relative to said planar surface;

(c) third means for moving said drive member in its predetermined way whereby to adjust the position of said apparatus in the y-direction relative to said planar surface;

(d) fourth means engaged against a fixed surface of said plate member segment spaced from said first and second means and movable in a predetermined way relative to said planar surface while remaining in engagement with said fixed surface for moving said plate member segment and said first means to a limited extent in the x-direction relative to said planar surface and said second means while said first means remains engaged against said second means;

(e) fifth means for moving said fourth means in its predetermined way whereby to adjust the position of said plate member segment in the x-direction relative to said planar surface and said second means; and (f) sixth means for moving said plate member segment to a limited extent in the z-direction relative to said planar surface and relative to said first means while the latter remains interlocked for movement with said plate member segment in the x- and y-directions, whereby to adjust the position of said plate member segment in the z-direction relative to said planar surface and said first means.

* * * * *